United States Patent [19]

Jarman et al.

[11] 4,375,131
[45] Mar. 1, 1983

[54] VEHICLE FRAME DATUM LINE REFERENCE SYSTEM

[76] Inventors: Davis R. Jarman, 612 Ward Dr.;
Virgil H. Hinson, 206 Fairway Oaks Dr., both of Brunswick, Ga. 31520

[21] Appl. No.: 150,676

[22] Filed: May 14, 1980

[51] Int. Cl.³ .............................................. G01B 5/25
[52] U.S. Cl. ................................... 33/288; 33/143 R; 33/158; 33/180 AT; 33/192
[58] Field of Search ................ 33/143 R, 137 L, 192, 33/191, 288, 143 M, 27 C, 494, 158, 180 AT, 181 AT

[56] References Cited

U.S. PATENT DOCUMENTS

| 1,816,695 | 7/1931 | Pope | 33/143 R |
| 2,816,366 | 12/1957 | Barlow | 33/180 R |
| 3,213,544 | 10/1965 | Adler | 33/137 L X |
| 3,330,478 | 7/1967 | Berry | 33/137 L X |
| 3,983,635 | 10/1976 | Jarman | 33/288 |
| 4,058,903 | 11/1977 | Wilkerson | 33/288 |
| 4,291,468 | 9/1981 | Follett | 33/192 |

Primary Examiner—William D. Martin, Jr.
Attorney, Agent, or Firm—Harvey B. Jacobson

[57] ABSTRACT

A system of three gauges is provided and each gauge includes an upright support standard for support from a horizontal surface extending along one side of a vehicle frame elevated relative to the surface and each support standard includes an elongated horizontal body having a first reference location at one end and a second reference location carried by and shiftable longitudinally of the other end of the body. Scale structure is provided on each gauge operative to indicate changes in the spacing, longitudinally of the body, between the first and second reference locations and the scale structure includes an indicator portion for indicating changes in the distances between the first and second reference locations equal to twice the actual change in distance therebetween.

4 Claims, 6 Drawing Figures

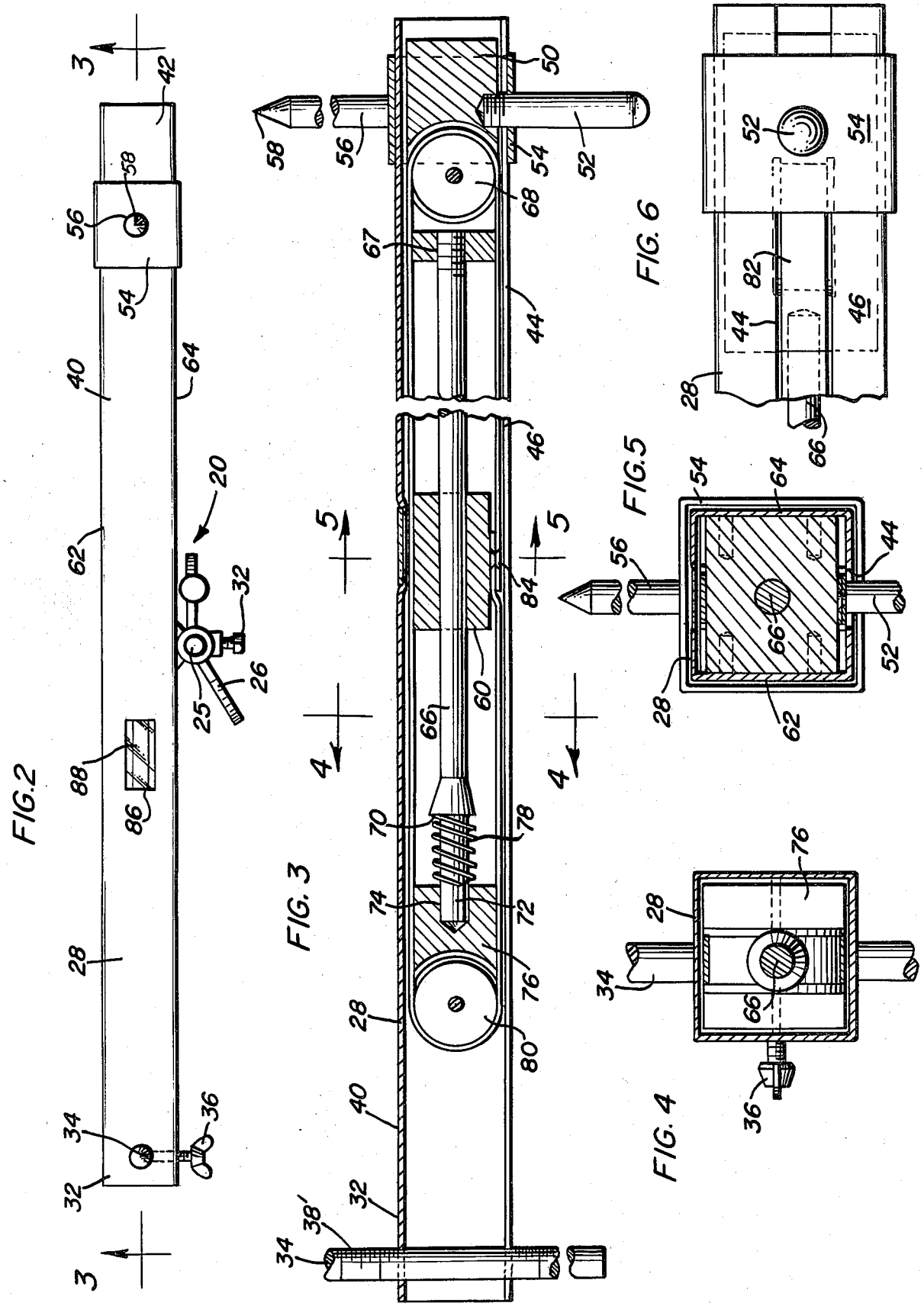

VEHICLE FRAME DATUM LINE REFERENCE SYSTEM

BACKGROUND OF THE INVENTION

Various forms of gauges heretofore have been provided for use in determining the proper spacing between vehicle frame opposite side portions. Examples of these previously known forms of gauges are disclosed in U.S. Pat. Nos. 2,481,420, 2,575,194, 2,581,021, 2,798,296, 3,057,074, 3,151,396, 3,611,575, 3,704,522 and 3,810,313 as well as German Pat. No. 1,071,620 and Great Britain Pat. No. 963,282.

However, these previously known forms of frame gauges are not specifically adapted for determining proper spacing of opposite side portions of a vehicle frame relative to a longitudinal center line of that frame. Accordingly, a need exists for a gauge which will be operative not only to indicate proper spacing between opposite side vehicle frame components but also proper spacing of opposite side frame components relative to a frame longitudinal center line.

BRIEF DESCRIPTION OF THE INVENTION

The gauge system of the instant invention incorporates the use of three gauges, two of which are to be utilized in conjunction with vehicle frame side portions which are commonly known to be correctly aligned in most instances. These two gauges are operatively positioned relative to the aforementioned frame side portions and the third gauge is thereafter positioned in operative association with other frame portions at the same side of the associated frame. The three gauges each include a first reference location to be positioned in operative association with the corresponding frame side portion and a second shiftable reference location to be preset according to an associated frame chart setting forth the proper spacing of the associated frame side portions relative to the center line of the frame. After this has been accomplished, a sighting may be taken along the three second reference locations to determine if the second reference location of the third gauge is aligned with the second reference location of the first two gauges. Of course, if misalignment is noted the frame side portion with which the third frame gauge is operatively associated must be jacked into proper position.

The main object of this invention is to provide a vehicle frame datum line reference gauge system which will be operative to indicate proper spacing of various opposite side frame portions relative to the center line of an associated frame.

Another object of this invention is to provide a gauge system which may also be utilized to determine proper spacing between corresponding opposite side frame portions.

Still another object of this invention is to provide a gauge system which may be readily utilized in conjunction with various types of vehicle frames.

Another important object of this invention is to provide a gauge system including a plurality of gauges supportive in relative horizontal alignment and yet be operatively associated with non-horizontally aligned frame portions.

A final object of this invention to be specifically enumerated herein is to provide a frame gauge system in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is a top plan view of the horizontally elongated body portion of one of the gauges;

FIG. 3 is an enlarged fragmentary vertical sectional view taken substantially upon the plane indicated by the section line 3—3 of FIG. 2;

FIG. 4 is a fragmentary transverse vertical sectional view taken substantially upon the plane indicated by the section line 4—4 of FIG. 3;

FIG. 5 is a fragmentary transverse vertical sectional view taken substantially upon the plane indicated by the section line 5—5 of FIG. 3; and FIG. 6 is an enlarged fragmentary bottom plane view of the right-hand end portion of the gauge body illustrated in FIG. 3.

DETAILED DESCRIPTION OF THE INVENTION

Figure 1:
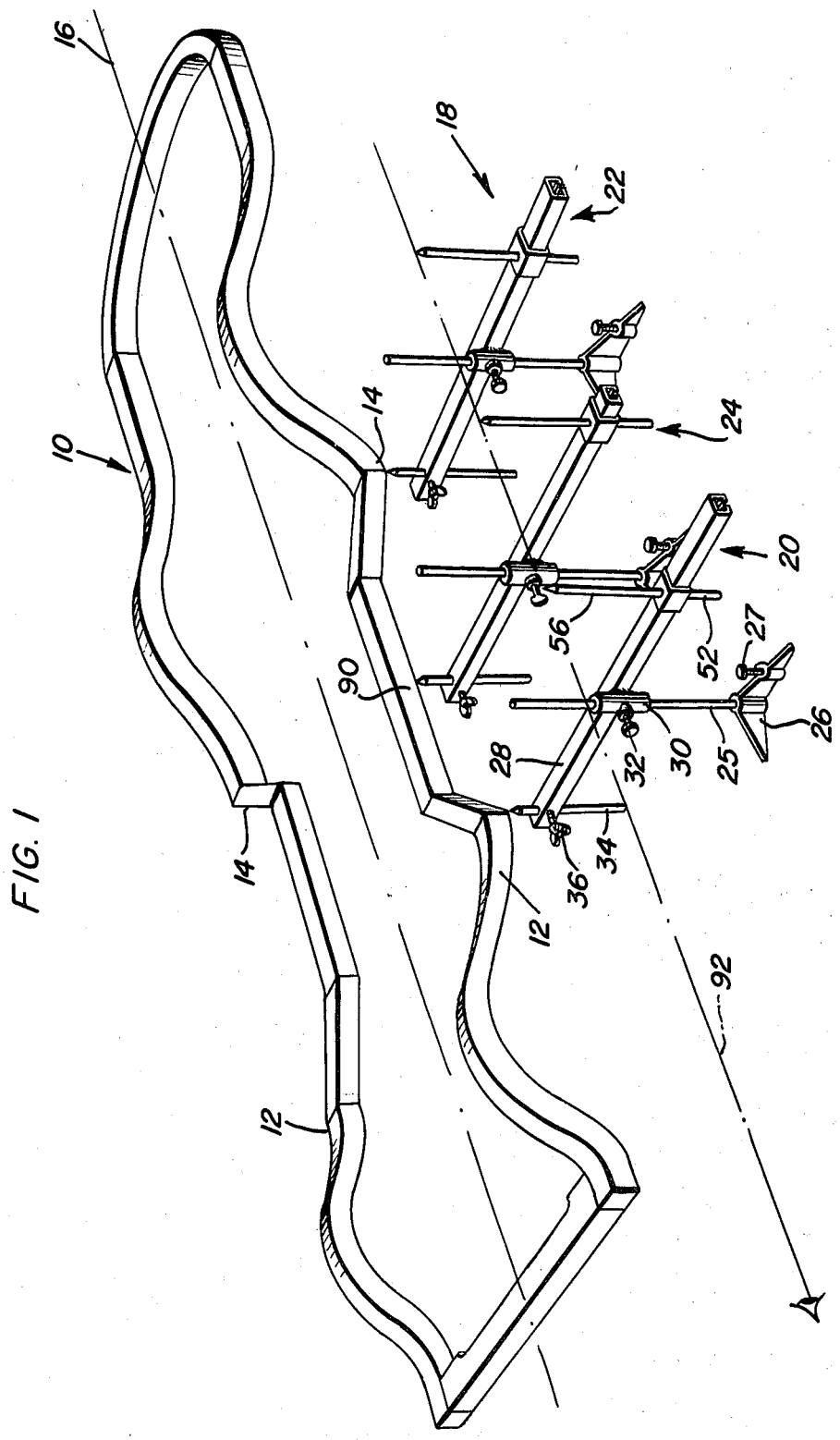
FIG. 1 is a perspective view of the gauge system of the instant invention operably associated with a vehicle frame.

Referring now more specifically to the drawings, the numeral 10 generally designates a conventional form of vehicle frame including opposite side frame locations 12 and 14 which are substantially always found to be properly laterally spaced relative to the frame longitudinal center line 16.

The gauge system of the instant invention is referred to in general by the reference numeral 18 and includes three substantially identical gauges referred to in general by the reference numerals 20, 22 and 24. Inasmuch as the gauges 20, 22 and 24 are substantially identical in construction, only the gauge 20 will be described in detail.

The gauge 20 includes an upright cylindrical standard 25 having a floor engageable base 26 on its lower end for support from a flooring surface relative to which the frame 10 is stationarily supported. The base 26 includes an adjusting screw 27 whereby the standard 16 may be vertically positioned.

The gauge 20 further includes a horizontal elongated tubular body 28 having an upstanding sleeve 30 supported from one side of the longitudinal midportion thereof and the sleeve 30 includes a set screw 32 threadedly supported therefrom for clamping against the standard 25 to releasably retain the sleeve 30 in adjusted rotated position on the standard 25 and in adjusted vertical position thereon.

As can best be seen from FIG. 2 of the drawings, one end 32 of the body 28 supports a first upstanding and vertically shiftable reference location pointer 34 therefrom and includes a set screw 36, see FIGS. 1 and 5, for releasably retaining the pointer in adjusted vertically shifted position relative to the body 28. The pointer 34 includes scale indicia 38 thereon registrable with the top wall 40 of the body 28.

As may best be seen from FIGS. 4 and 6 of the drawings, the second end 42 of the body 28 includes a central longitudinal slot 44 formed in its bottom wall 46 and a slide block 50 is slidingly disposed within the second end 42 of the body 28 for longitudinal shifting therein. The slide block 50 includes a depending handle shank 52 supported therefrom slidingly received through the slot 44 and a support sleeve 54 is mounted on the exterior of the second end 42 of the body 28 for guided sliding movement therealong and is operatively connected to the handle shank 52. The upper portion of the support sleeve 54 supports a second reference location pin 56 therefrom including a pointed upper terminal end 58.

The central portion of the tubular body 28 has a guide block 60 removably secured therein between the opposite sides 62 and 64 of the body 28 and the guide block 60 includes a central bore 65 formed therethrough. The guide block 60 is spaced below the top wall 40 and above the bottom wall 44 of the body 28 and slidingly receives the longitudinal midportion of a connecting bar 66 therethrough. The end of the connecting bar 66 adjacent the slide block 50 is threadedly engaged in a threaded blind bore 67 formed in the block 50 and the latter rotatably journals a pulley 68 therefrom. The end of the connecting bar 66 remote from the slide block 50 includes a diametrically enlarged shoulder 70 formed thereon a spaced distance from the terminal end 72 thereof and the terminal end 72 is slidingly received within a socket 74 formed in a second slide block 76 slidingly received within the end 32 of the body 28. A compression spring 78 is disposed between the shoulder 70 and the opposing face of the block 76 outwardly through which the socket 74 opens. The block 76 is also slotted and rotatably journals a pulley 80 therefrom.

An elongated flexible measuring tape 82 is trained about the pulleys 68 and 80 and has overlapped opposite ends secured to the slide block 60 through the utilization of a suitable fastener 84 secured through the bottom wall 46. The top wall 40 of the body 28 includes a window opening 86 formed therein above the block 60 and the upper reach of the tape 82 passes over the block 60 and below the window 86, the window 86 having a transparent panel 88 therein.

In operation, the first two gauges 20 and 22 are positioned adjacent the frame 10 in the manner illustrated in FIG. 1 of the drawings with the pins 34 registered with the locations 12 and 14, the height of the pins 34 being adjustable according to the height of the locations 12 and 14, and the bodies 28 of the gauges 20 and 22 being horizontally registered. Thereafter, the slide blocks 50 of the gauges 20 and 22 may be shifted until the desired indicia of the tapes 82 thereof are registered with the window 86 according to a frame chart indicating the proper spacing between the locations 12 and 14 of the frame 10 from the center line 16 of the frame 10. Thereafter, if the location 90 of the frame 10 is to be checked relative to the center line 16, the slide block 50 of the gauge 24 is shifted until the proper indicia of the tape 82 is registered with the window 86 of the gauge 22, according to the frame chart pertaining to the frame 10. Then, the gauge 24 is placed in position and a sighting is made along the datum line 92 established between the upper ends of the pointers 56 of the gauges 20 and 22 to determine if the upper end of pointer 56 of the gauge 24 lies on the datum line 92. Of course, if the upper end 58 of the pointer 56 supported from the gauge 24 does not lie along the datum line 92, proper steps must be taken to jack the frame location 90 into proper position.

When the block 50 of one of the gauges is shifted to the left as view in FIG. 3, the rollers 68 and 80 are also shifted to the left together with rod 66 which extends between and connects the blocks 50 and 76. As the rollers 68 and 80 shift to the left while the block 60 and fastener 84 remain stationary, the roller 80 unrolls the forward portion of the upper reach of the tape 82 in front of the block 76 and the roller 68 rolls up the rear portion of the lower reach of the tape 82 over the roller 68. Thus, the tape moves past the window 86 at a rate equal to twice the rate of displacement of the blocks 50 and 76 relative to the tubular body 28.

It is also pointed out that the pointers 34 and 58 may be utilized to determine if proper spacing exists between corresponding opposite side portions of the frame 10.

If it is desired, each of the bodies 28 may be provided with a spirit level in order to more accurately ascertain whether the bodies 28 are each horizontally disposed and thus it may be apparent that the gauge system 18 may accurately determine the proper spacing of various opposite side frame locations relative to the longitudinal frame center line 16.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A vehicle frame datum line reference gauge, said gauge including an elongated horizontal body having first reference locations means at one end, second reference location means carried by and shiftable longitudinally of the body, scale means operative to indicate changes in the spacing, longitudinally of said body, between said first and second reference location means, said scale means including indicator means for indicating change distances equal to twice the actual change distance, said body being tubular and the central portion thereof having a guide block stationarily mounted therein, an elongated longitudinal support member slidably supported from said guide block for longitudinal shifting relative to said body, first pulley means journaled from the end of said support member adjacent said one body end, second pulley means journaled from the end of said support member adjacent the other body end, and an elongated measure tape trained about said pulleys and anchored relative to said guide block, said tubular body having a window opening formed therein with which said measure tape is registered.

2. The combination of claim 1 wherein the first and second reference location means each include a vertical upstanding pointer supported from said body.

3. The combination of claim 1 including means functioning to yieldingly tension said measure tape.

4. The combination of claim 3 wherein the first and second reference location means each include a vertical upstanding pointer supported from said body.

* * * * *